United States Patent [19]

Anchutin

[11] 3,948,468
[45] Apr. 6, 1976

[54] REPLACEABLE SOLAR ARRAY PANELS
[75] Inventor: Andrew Anchutin, Titusville, N.J.
[73] Assignee: RCA Corporation, New York, N.Y.
[22] Filed: Sept. 27, 1971
[21] Appl. No.: 184,130

[52] U.S. Cl. ............................................ 244/173
[51] Int. Cl.² ............................................ B64G 1/10
[58] Field of Search ............... 244/1 SS, 1 SA, 173; 136/89, 206; 250/203 R, 237 R, 239; 60/26

[56] References Cited
UNITED STATES PATENTS

| | | | |
|---|---|---|---|
| 3,412,955 | 11/1968 | Vilbig | 244/1 SS |
| 3,515,594 | 6/1970 | Samuels | 250/203 R X |
| 3,544,041 | 12/1970 | Billerbeck et al. | 244/1 SS |
| 3,559,919 | 2/1971 | Sass | 244/1 SS |
| 3,597,281 | 8/1971 | Webb | 136/206 |
| 3,620,846 | 11/1971 | Paine et al. | 136/89 |

Primary Examiner—Trygve M. Blix
Assistant Examiner—Barry L. Kelmachter
Attorney, Agent, or Firm—Joseph D. Lazar; Edward J. Norton

[57] ABSTRACT

A replaceable solar array panel for spacecraft is formed of two or more panels one of which being visible or exposed to the sun and other surfaces being shielded from the sun. The exposed and shielded surfaces are arranged to be replaced by moving or rotating a shielded surface into an exposed surface orientation and to eject, move or rotate an exposed panel surface. The activation of the movements required may be automatic or remotely controlled from a ground-based station upon appropriate indications of the need for replacement of damaged or otherwise deteriorated exposed surfaces.

14 Claims, 15 Drawing Figures

INVENTOR.
Andrew Anchutin
BY
*J D Lazar*
ATTORNEY

ROTATE 2-SIDED PANELS 180°
TO CHANGE THE SURFACE
(TO SECONDARY SURFACE)

ROTATE 3-SIDED
PANELS 120° TO CHANGE TO
NEXT UNDAMAGED SURFACE

INVENTOR.
Andrew Anchutin
BY
J D Lazar
ATTORNEY

REPLACEABLE SOLAR ARRAY PANELS

The invention herein described was made in the course of or under a contract or subcontract thereunder with the Department of the Navy.

BACKGROUND OF THE INVENTION

1. Field of the Invention

This invention relates to replaceable solar array panels, in which the solar cells provide electrical energy for the equipment operating in a spacecraft.

2. Description of the Prior Art

Spacecraft normally carry an electrical power subsystem for providing the requisite electrical energy needed for the control to operate spacecraft subsystems such as: attitude control, communication equipment, sensors, cameras, radiometers, and other scientific instrumentation. Such spacecraft employ solar cells arranged in various types of arrays for converting direct solar energy into electrical energy. The outer or exposed surfaces of the spacecraft body are available to be covered with solar cells suitably mounted. This type of arrangement is called a body-mounted solar array. Various techniques have been used to extend or enlarge the available surface for supporting solar arrays such as deployable panels. These extendable solar arrays can be fixed or oriented to be constantly facing the sun.

To launch the spacecraft into its orbit, the solar arrays must be suitably positioned or stowed within the shroud or fairing of the launch vehicle to allow for minimum interference with the movement of the spacecraft during the launching phase. Thereafter, as for example, as the spacecraft is in orbit, the solar arrays are deployed or otherwise positioned into an operating position to perform their function. In some launch conditions, the solar panels may be in operative position prior to achievement of orbit. In those cases the solar panels may be damaged causing failure of the electrical subsystems.

In the event of massive failure of the solar cells of the array as would be occasioned by a nuclear blast or other destructing phenomena, or owing to the general deterioration of the solar array in its ability to convert the solar energy into electrical energy, the electrical energy developed by such solar arrays is lost or reduced to non-useful levels to meet the needs of the spacecraft. The useful life of spacecraft, generally, is subject to and limited by the useful life of the solar arrays.

SUMMARY OF THE INVENTION

The present invention is directed to replaceable solar array panels comprising one or more surfaces, one of which surface being exposed to the sun and the other surface being shielded from the sun. The surfaces are arranged to be replaced, one with another so that if surfaces exposed to the sun are damaged they are ejected or become stowed and previously shielded surfaces becomes exposed to the sun thereby replacing damaged or deteriorating solar arrays.

DESCRIPTION OF THE PREFERRED EMBODIMENTS

Figure 1:
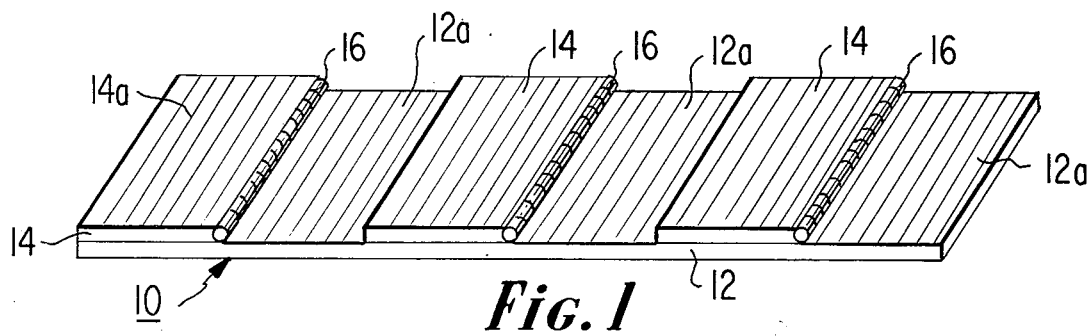
FIG. 1 is a perspective view of the elemental panels forming the replaceable surfaces according to the invention.

The replaceable surface of a panel carrying solar cells according to the present invention, includes a composite panel 10 formed of a stationary panel 12 and a plurality of movable panels 14. The panels are pivoted about hinges 16 from the position shown in FIG. 1 to the position shown in FIG. 3, through an intermediate position shown in FIG. 2.

Each surface of the movable panels 14 are covered with suitable solar cells for converting solar energy into electrical energy. Suitable electrical connections between the cells are provided to interconnect the cells into desirable arrays for developing the required electrical power. For convenience, the solar cell array that are initially visible or exposed to the sun are represented in the drawing by the parallel lines as indicated by portions 14a, while those surfaces which are shield from external exposure to the sun are indicated in the drawing by the crosshatching as indicated at portions 14b.

The stationary panel 12 is totally covered on its surface, as seen in the drawing, with solar cells. Since certain portions of the surface of panel 12 is covered initially with the panels 14, only those portions of panel 12 not covered will be initially exposed. These portions are shown in FIG. 1 with parallel lines as portions 12a. The remaining portions of the stationary panel 12 when exposed by the movement of the panels 14 are the shielded portions indicated by 12b.

The stationary panel 12 is subdivided into several parallel strips as indicated, which are alternating as primary and secondary surfaces, the primary surfaces serving as the initial surfaces exposed to the sun and the secondary surfaces being the stored surface that are shielded from the sun during the first phase of its use. The widths (along hinges 16) of movable panels 14 are equal, i.e., matched, to the width of the stationary panel 12 but their lengths are equal, respectively, to the parallel strips of panel 12. The movable panels 14 are hinged at 16 on one of their edges to the stationary panel 12 at the boundary of each pairs of strips, as illustrated in FIGS. 1, 2, and 3.

Figure 2:
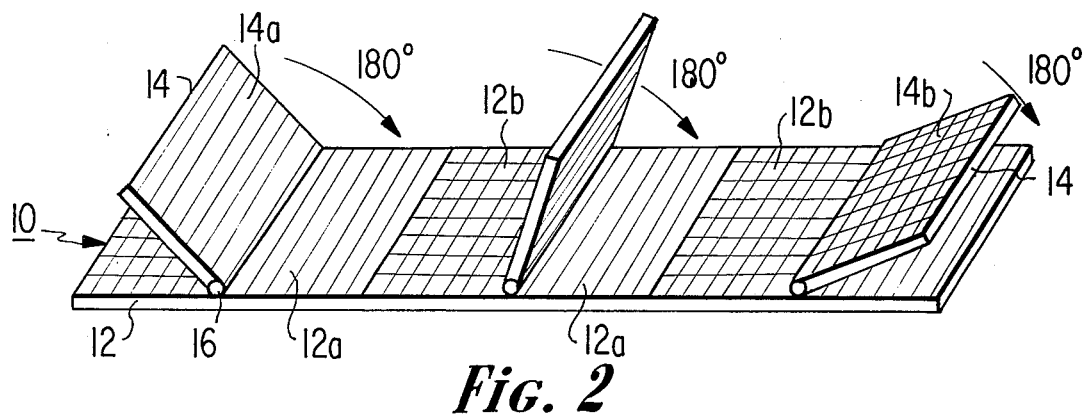
FIG. 2 is a perspective view of the panels shown in FIG. 1 being rotated from one operating position to another.
Figure 3:
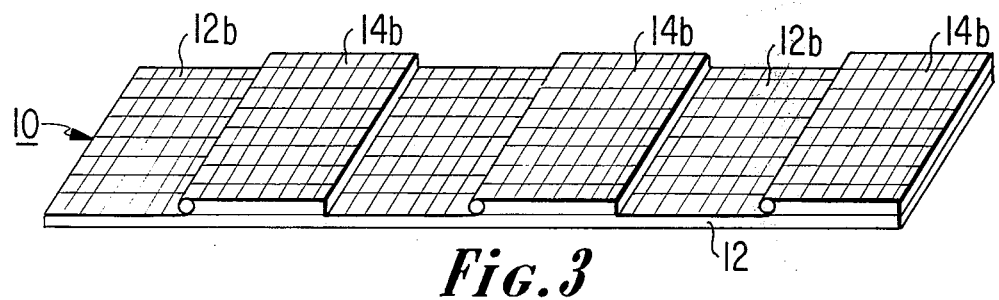
FIG. 3 is a perspective view of the panels shown in FIGS. 1 and 2 repositioned.

When the movable panels 14 are rotated through an angle of 180°, as shown in FIG. 2, the secondary surfaces of panels 14b and the secondary surfaces of the stationary panel 12b become visible and thus exposed to the sun as illustrated in FIG. 3. The effect of this arrangement is such that when the movable panels 14 are oriented in one direction, only the primary surfaces 12a and 14a are visible and exposed to the sun as shown in FIG. 1. When the movable panels 14 are moved about their hinges, the primary surface of the panels become invisible and the previously shielded stationary surfaces are made visible, as illustrated in FIG. 3.

The rotation or movement of the panels 14 may be accomplished individually on a panel-by-panel basis or may be rotated or movement as a group, simultaneously, so that the entire area is controlled from the primary to the secondary surface arrangement. The rotation of the movable panels 14 may be effected by suitable rotary or linear actuators controlled electronically.

The electronic control of the actuator may be energized in response to suitable sensing devices to indicate the condition of the solar cells as by, for instance, a threshold device. Alternative ways of operating the movable panels may be accomplished by the use of spring loaded devices with viscous damper and release mechanisms operated on command or automatic program.

In using the invention in spacecraft, the primary and secondary surfaces of the movable members are covered with solar cells. Initially, when the primary surfaces are exposed to the sun, the solar cells generate electrical energy to operate the spacecraft electrical systems.

When the solar cells on the primary surfaces are damaged as by exposure to cosmic rays or nuclear blast and other particles of radiation that deteriorate or destroy the solar cells, the movable panels 14 are rotated automatically or by command from a ground station to expose the previously shielded (undamaged) solar cells. By this process the power of the spacecraft is restored to its full operating capacity.

Heretofore, the useful life of satellites, depending upon solar cells for electrical energy, were limited to about five years. According to the present invention the life of a satellite in terms of its electrical energy may be extended to a much longer period of time. In general, simply replacing one group of primary surfaces with an equal number secondary surfaces will extend the life by a factor of two.

Figure 4:
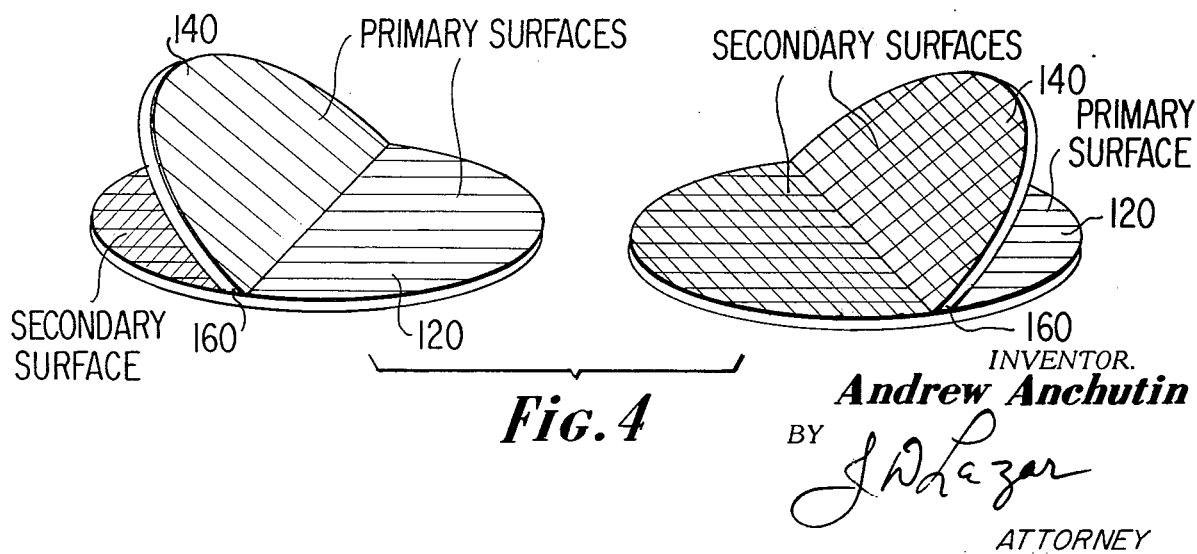
FIG. 4 is a perspective view showing with the embodiment of the surface as shown in FIGS. 1–3, as applied to a solar array on a curved panel.

Referring to FIG. 4, there is shown a modification of an individual replaceable surface in a non-rectangular shape having a stationary panel portion 120 of generally oval or elliptical form with a movable panel 140 about a hinge 160.

Figure 5:
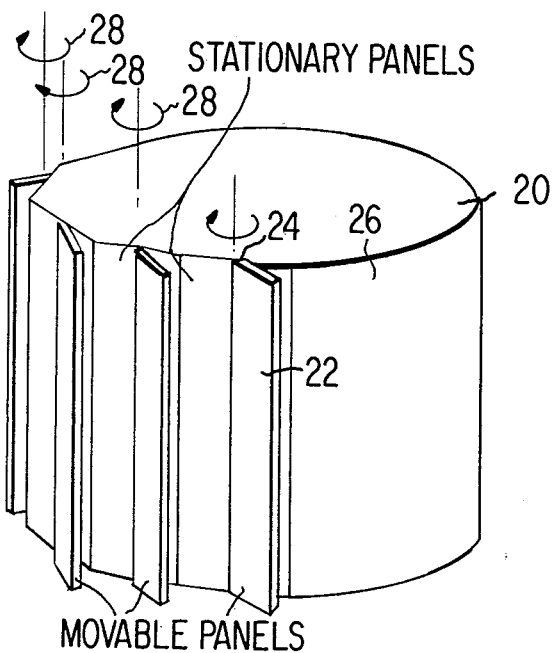
FIG. 5 is a perspective view of a state with the embodiment of the invention showing the replaceable panels on a cylindrical surface.

The composite panel of FIGS. 1, 2, and 3 may be formed on the curved surface of a device such as a cylindrical satellite as illustrated in FIG. 5. A spacecraft 20 of cylindrical form is provided with a series of movable panels 22 hinged at axes 24 on the surface 26 of the spacecraft. The panels 22 are provided with solar cells on both surfaces thereof and the surface 26 of the satellite 20 is also totally covered with solar cells. In operation, the panels are rotated from one positon initially in contact with the surface 26 as indicated by the arrows 28, to a new position covering the adjacent, previously exposed surfaces on the outer surface 26. This movement replaces the primary surfaces with the secondary surfaces.

FIGS. 6a, 6b, 6c, and 6d illustrate the use of the composite panel of the invention in an orthogonal three-dimensional body 30. The body is provided with five replaceable surface panels for the convenience of illustrating the principle of the invention on such a structure. It is to be understood that this embodiment can be modified so that less than the entire surface can be provided with replaceable panels.

The replaceability of the surfaces is achieved by using one, top movable panel 32 and four, side movable panels 34, 36, 38, and 40. The panels are each provided with a primary surface, shown with parallel lines, of solar cells and the opposite side of the panels are provided with a secondary surface of solar cells, indicated by the crosshatch lines. By rotating the top movable panel 32 through a movement of 180° and each of the four panels 34, 36, 38, and 40 through a rotation of 270°, the surfaces on all five sides of the body 30 are replaced. It is usual practice in the spacecraft art not to cover the sixth surface of the body with solar cells since that surface is for use of other apparatus such as television camera sensors, antennae, and the like.

Figure 6A:
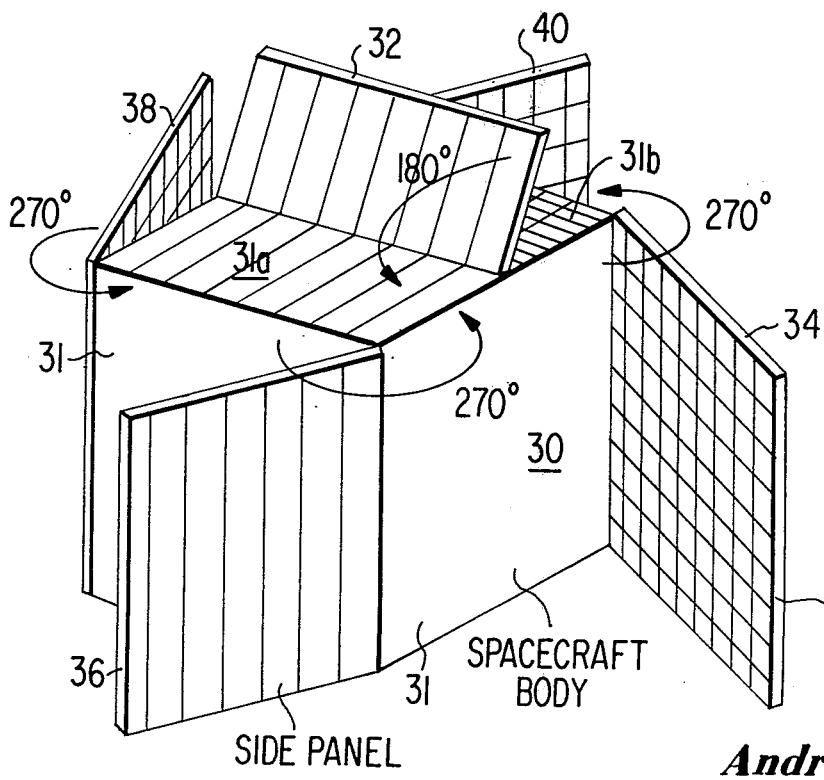
FIGS. 6a, 6b, 6c, and 6d show a further application of the invention in an orthogonal, three dimensional form.
Figure 6B:
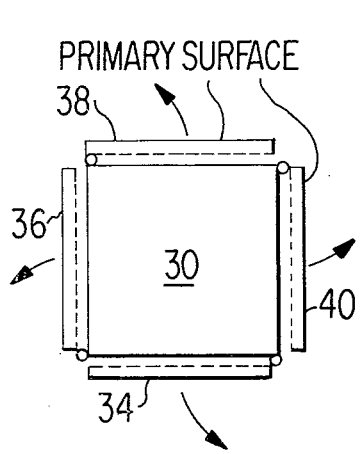
Figure 6C:
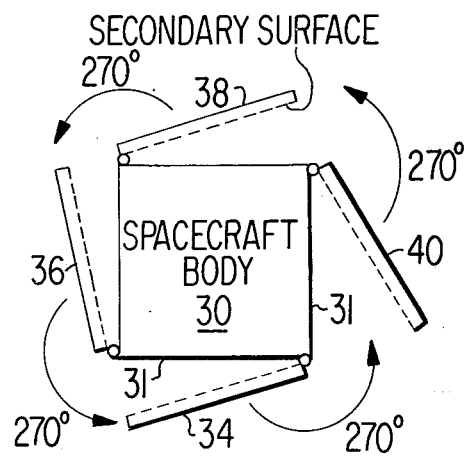
Figure 6D:
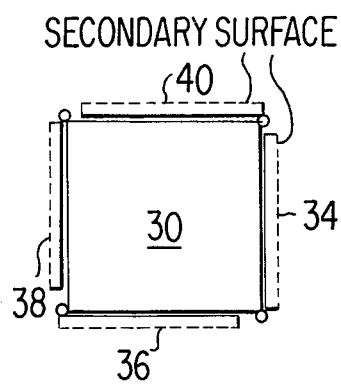

The surfaces 31 of the body of the spacecraft are not provided with solar cells since the side panels 34, 36, 38, and 40 are in one position or the other covering the sides 31 of the spacecraft. However, the top surface of the spacecraft body is provided with solar cells on surface portion 31a for the primary solar cells and surface portion 31b for the secondary or shielded cells in the manner described with respect to FIGS. 1, 2, and 3. FIGS. 6b, 6c, and 6d illustrate the sequence of positions of the side movable panels as they are oriented from the primary position shown in FIGS. 6b to the secondary position shown in FIGS. 6d, FIG. 6c illustrating the manner in which the panels are moved from the primary and secondary position.

Figure 7:
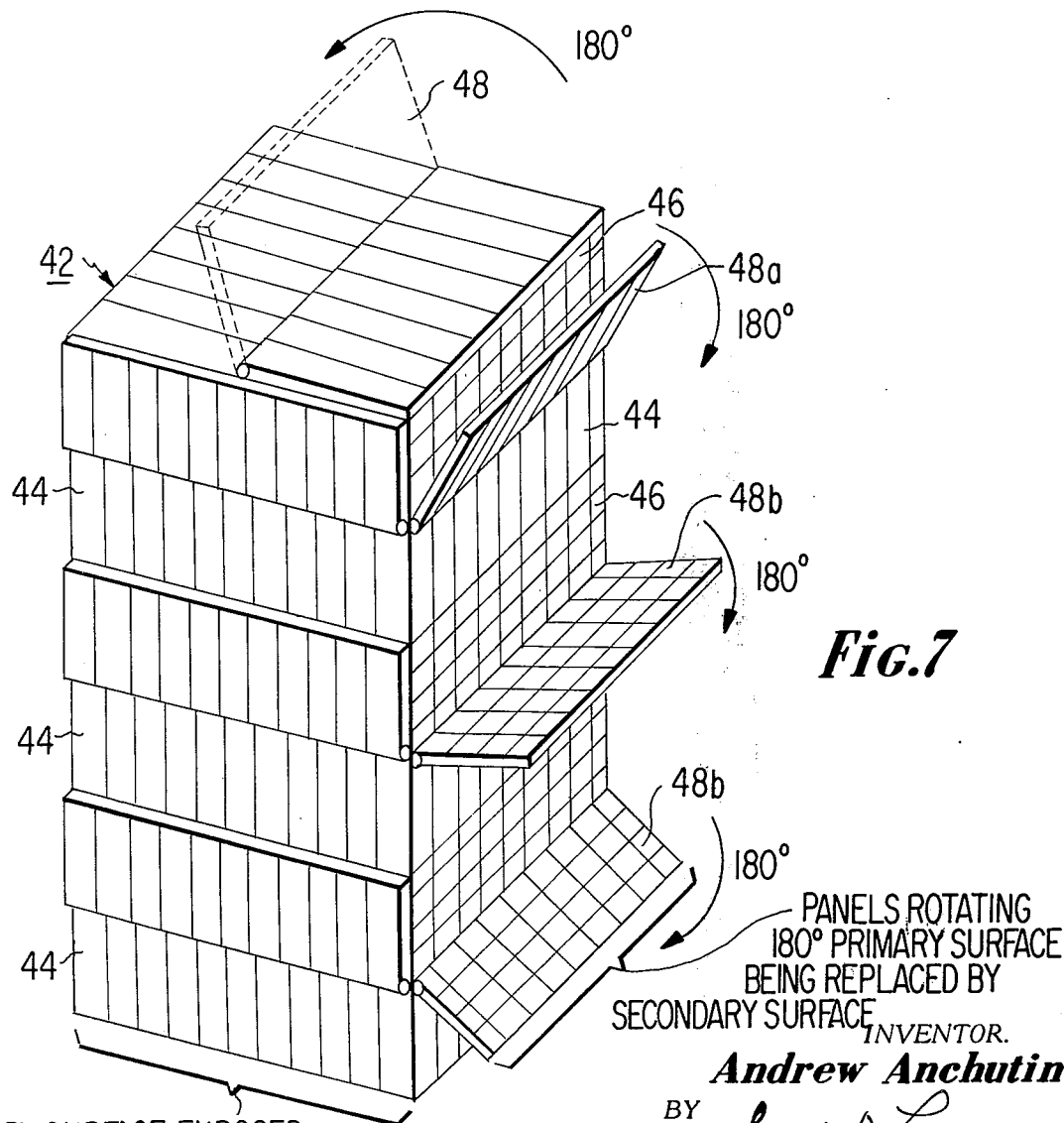
FIG. 7 is a perspective view illustrating another embodiment of the invention wherein the replaceable panels are subdivided into a plurality of surface portions.

Referring now to FIG. 7 there is illustrated an embodiment of the invention in which flat-panels are utilized to provide for a subdivision of the several panels in an orthogonal three dimensional body. The surface of the body 42 is provided with a plurality of primary surface portions 44, an associated plurality of secondary surface portions 46 and corresponding movable panels 48. Both sides of the movable panels are provided with solar surfaces. One side, 48a, is considered the primary solar surface and the other side, 48b, is considered the secondary solar surface. The panels are moved from the primary to secondary position in the manner previously described.

Figure 8:
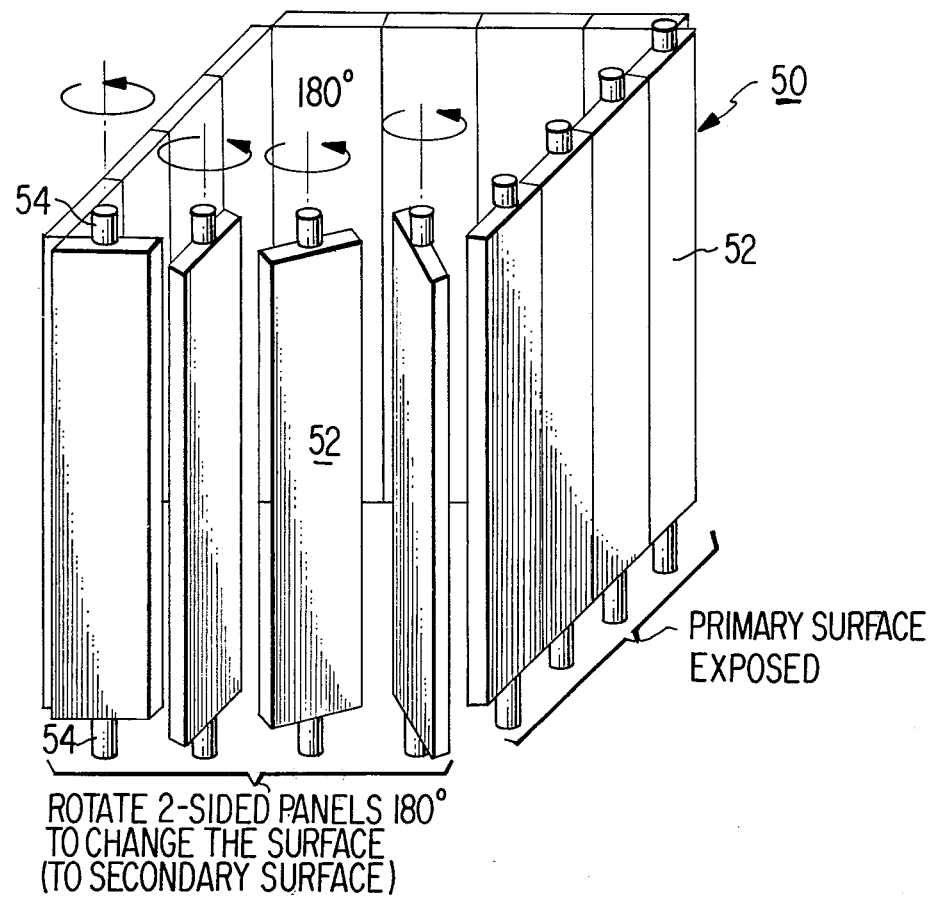
FIG. 8 is a perspective view illustrating a still further embodiment of the invention wherein the axis of rotation or pivot of the panels is at the center of the panel rather than along the edge.

Referring now to FIG. 8 there is illustrated another embodiment of the invention wherein the movable side panels are rotated about an axis in the center of the panels. A body 50 is provided with a plurality of panels 52, each panel being suitably pivoted about its center longitudinal axis on pivots or shafts 54 extending therefrom. This arrangement serves to replace the solar surface once in its lifetime.

Figure 9:
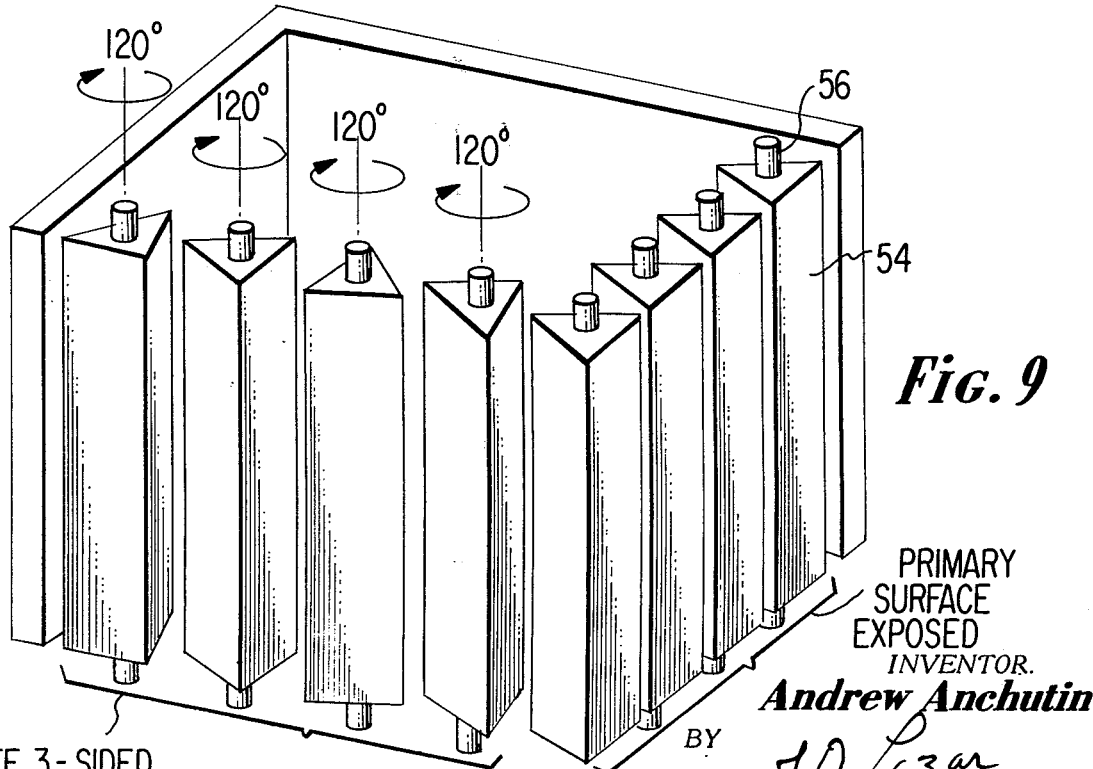
FIG. 9 is a perspective view of another embodiment of the invention showing a modification of the arrangement of FIG. 8 wherein the panels are provided with three surfaces.

Referring now to FIG. 9 there is shown a modification of the arrangement illustrated in FIG. 8. In this form the movable panels 54 are pivoted 120° about shafts 56 thereby exposing one of three of the sides of each panel so that one panel is exposed to the ambient and the remaining two surfaces are shielded from the ambient. This form serves to replace the solar surfaces twice during their lifetimes.

Figure 10:
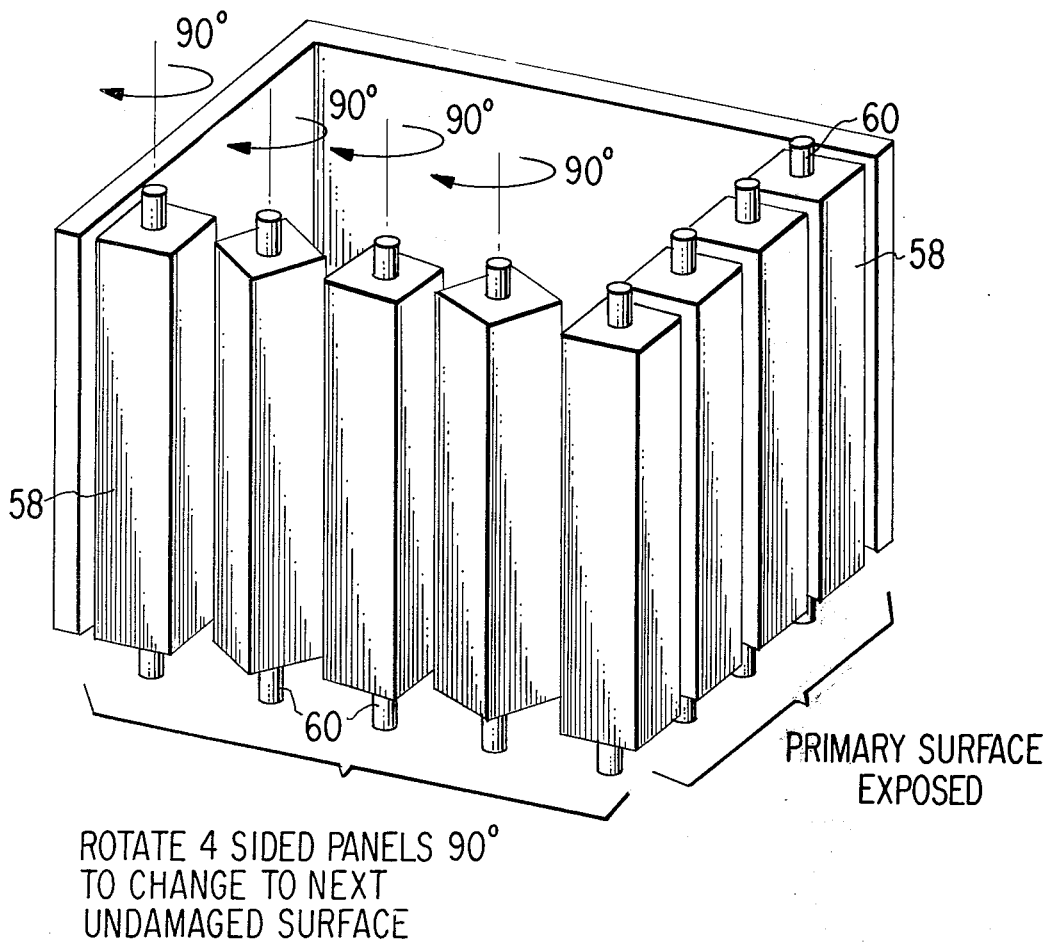
FIG. 10 is a perspective view of a still further embodiment of the invention showing a modification of FIG. 8 using four surfaces.

FIG. 10 illustrates a still further form of the invention whereby the panels 58 are of four-sided configuration, so that when rotated 90° about their shafts 60, one of four of the surfaces is exposed to the ambient, the three remaining surfaces being shielded from the sun for subsequent use as required. This allows for a three-time replacement of the solar surfaces.

Figure 11:
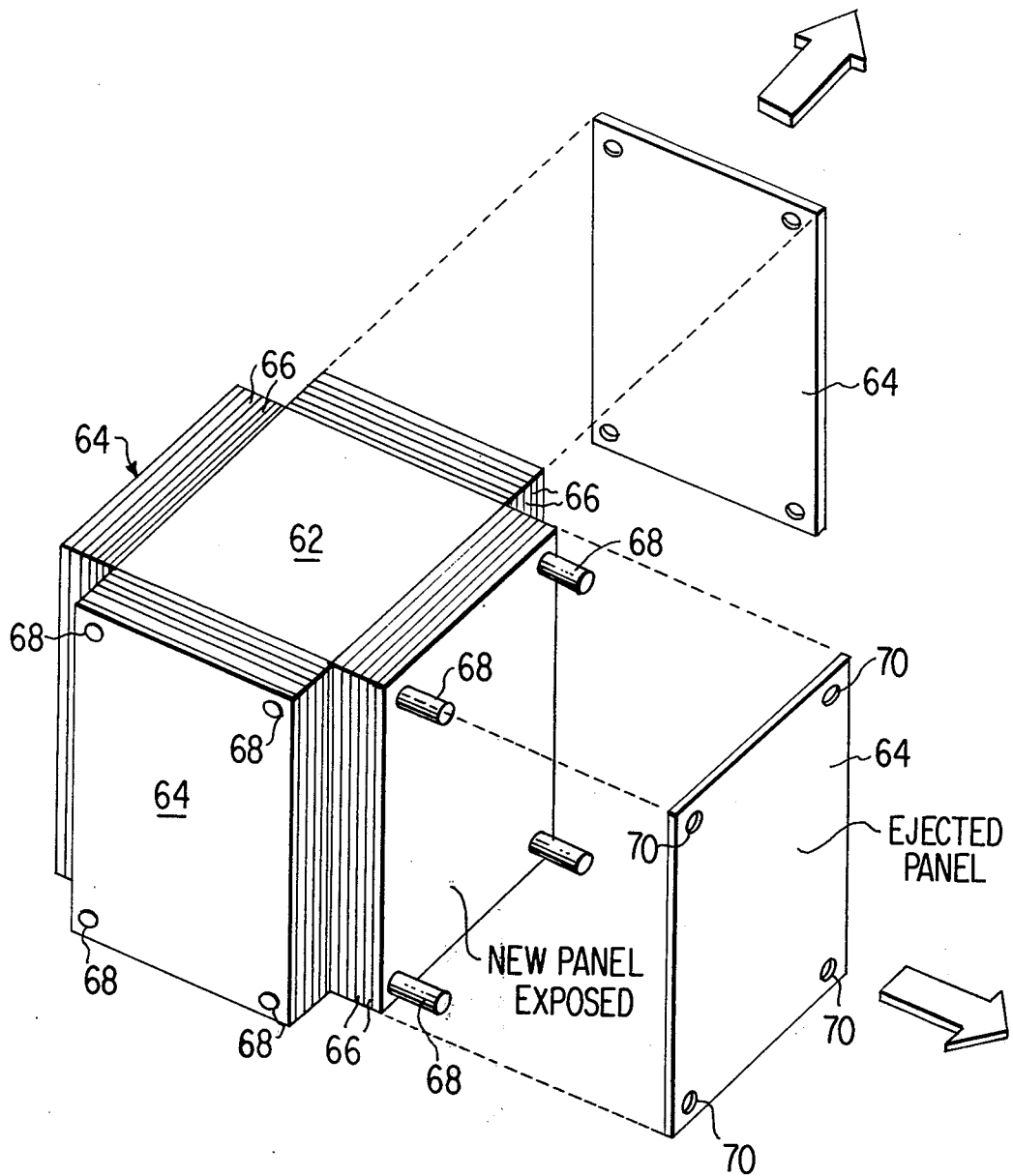
FIGS. 11 and 12 are perspective views of still further embodiments of the invention showing arrangements wherein the original or primary surfaces are arranged for ejection from the spacecraft when a replacement is required.

Referring now to FIG. 11 there is shown a modification of the invention whereby the primary panels are replaced by shielded panels by ejecting the primary panel and exposing thereunder a secondary panel. A body 62 is provided with a plurality of panels 64 only the outer surfaces of which being provided with solar cells. A plurality of shielded panels 66 are mounted beneath the primary panels 64 as by attachment through four posts 68 passing through corner holes 70 in register therewith on each panel. The panels are provided with suitable release and ejecting means such as pre-loaded springs and latches which are released when it is desired to replace panel 64 by a shielded panel 66.

Figure 12:
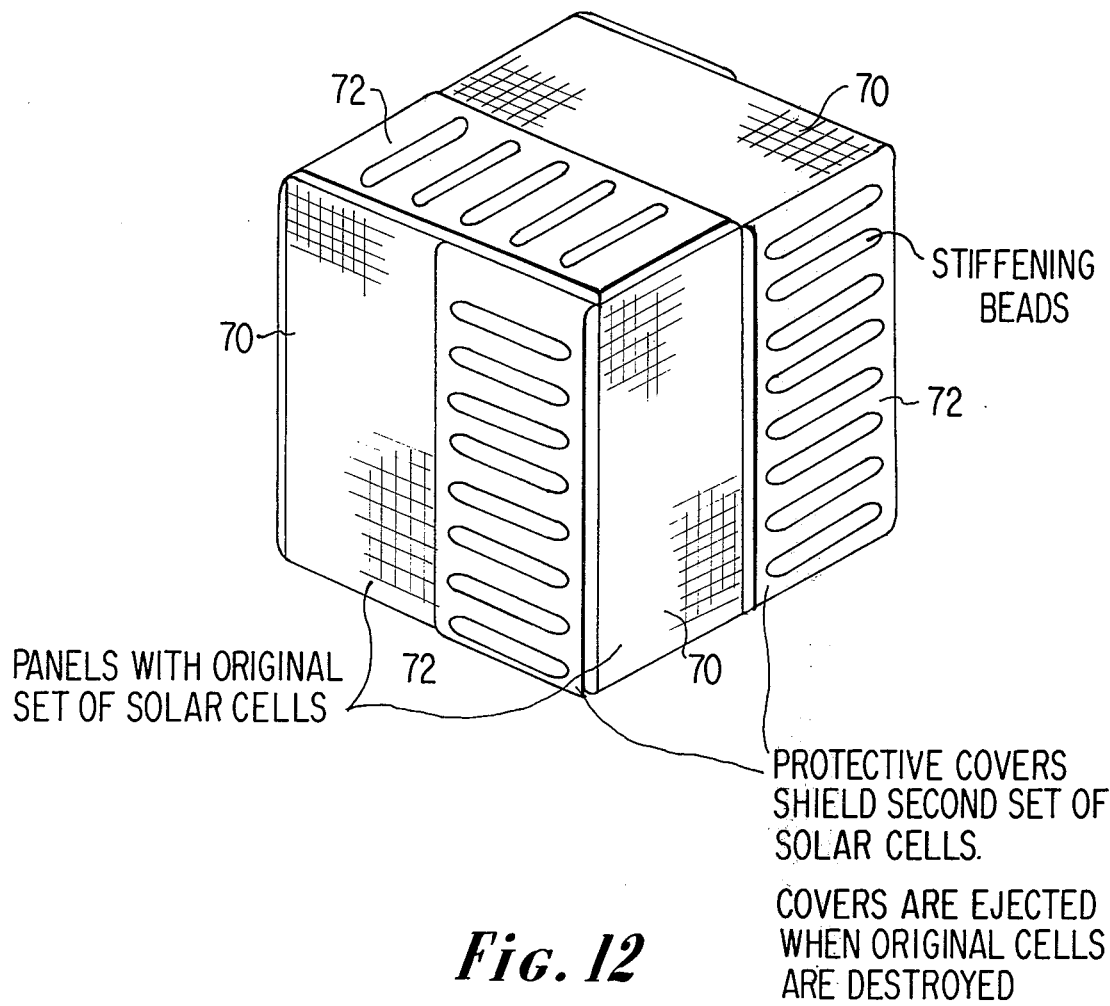

FIG. 12 illustrates a form of the invention in which the available area of replaceable surfaces is double or twice that shown in FIG. 11. The panels 70 are provided with the primary set of solar cells. Protective covers 72 shield the secondary set of solar cells. When required the covers 72 are removed or ejected by suitable means to expose the secondary cells.

The rotation of the movable panels may be accomplished by suitable rotary or linear actuators (solenoids, hydraulic, pneumatic or spring operated), which are controlled by suitable electronic devices. The panels also may be actuated by a spring-loaded hinge equipped with viscous damper to control the rotating motion of the panel. This may be accomplished by a remote controlled latch which is made to release the panels from their initial position and the preloaded springs rotate the movable panels.

In the case of the spacecraft solar array, the primary and secondary surfaces are covered with solar cells. Initially, when the primary surfaces are exposed to the sun, the solar cells generate electrical energy necessary to operate the spacecraft. When the solar cells (primary surfaces) are damaged (by nuclear blast or any other phenonema) the movable panels are rotated 180° by remote control exposing secondary surfaces with undamaged solar cells and the electrical subsystems of the spacecraft continue to operate. This remote control may be automatically operated by the system on board the spacecraft or by command from a ground station.

Suitable sensing devices, located on the solar panels provide information on the extent of damage to the solar cells. This information is processed electronically and, in the event the damage exceeds the allowable limit, a command (automatic or from the ground station) is sent to energize the actuators to replace the damaged solar panels.

What is claimed is:

1. In a spacecraft an array of a plurality of geometrical members each member having at least one surface adapted for exposure to the sun and provided with solar cells on said one surface,
a first portion of said plurality of members being arranged so that said one surface of each such respective member is initially faced to be exposed to the sun,
a second portion of said plurality of members being arranged so that the entire surface of said one surface of each of such respective members of said second portion is covered and thereby prevented from exposure to the sun,
means for moving each member of said first portion from its initial position to a second position wherein each said one surface of said second portion of members is exposed to the sun,
said moving means replacing the one surface of each such member of said first portion of members with a respective one surface of a member of said second portion of members, the respective position of each of said second portion surfaces being in substantially the initial position of each of said first portion surfaces, and faced to be exposed to the sun, whereby said spacecraft is provided with means to store for future use a plurality of solar cell members in a position wherein said one surfaces of said stored members are not initially exposed to the sun.

2. An array of members according to claim 1 wherein each of said members has solar cells on each surface of said members.

3. An array of panels according to claim 2 wherein said members are pivotal panels having each of both their respective surfaces provided with solar cells,
said pivotal panels being pivotally connected to a stationary panel along one edge of each of the pivotal panels and arranged to cover a portion of the surface of said stationary panel, said stationary panel having solar cells thereon, said pivotal panels being positioned to cover a portion of the solar cells on the stationary panel in the initial position and to expose said covered cells when said pivotal panels are pivoted to said second position on said stationary panel, whereby selected solar cell surface portions are exposed to the sun and selected other portions are shielded from the sun.

4. An array of panels according to claim 3 wherein said pivotal panels are rectangular and so disposed over said stationary panel to be parallel and equally spaced from each other a distance double their respective widths.

5. An array of panels according to claim 4 wherein said stationary panel is attached to the cylindrical outer surface of a cylindrical spacecraft.

6. An array of members according to claim 2 wherein each of said members is a panel having both of their respective surfaces provided with solar cells,
said panels being pivotally connected to the corners of a four sided structure,
said panels being arranged to be pivoted from one face to an adjoining face of said structure to expose sequentially each surface of each of said panels.

7. An array of panels according to claim 4 wherein said stationary panels are disposed on surfaces of four sides of a prism.

8. An array of members according to claim 2 wherein each of said members is a many sided rectangular prism, each side of which being provided with solar cells and pivoted about a longitudinal axis so that each of its solar cell surfaces is sequentially exposed to the sun.

9. An array of panels according to claim 1 wherein said members are stacked over a body surface, each member having solar cells on one surface remote from said body surface, and said moving means comprising means for ejecting the uppermost member to expose the next member to the sun.

10. In a spacevehicle or the like of the type including a solar panel for providing electrical power when exposed to solar radiation, the improvement comprising:
a first solar panel exposed to solar radiation and at least a second solar panel adapted to be exposed to solar radiation;
utilization means coupled to said first and second solar panels for receiving power from the exposed panel; and
control means for ejecting said first solar panel and for exposing said second solar panel to solar radiation when the power received from said first panel is degraded below a selected value.

11. The arrangement as recited in claim 10 wherein said first and second panels define a stack with said first panel being on top of said second panel so that when said first panel is ejected said second panel is automatically exposed to solar radiation.

12. The arrangement as recited in claim 11 wherein said improvement comprises a plurality of panel stacks each including a plurality of solar panels with the top panel of each stack being exposed to solar radiation, with each subsequent panel being covered by the preceding panels in the stack whereby when the top panel is ejected the panel below it is exposed to solar radiation while covering the panels thereunder.

13. The method of providing power in a satellite and the like from solar energy, the steps comprising:
exposing a first solar panel to solar energy to provide power therefrom;
providing a second solar panel which is not exposed to radiation of solar energy; and
ejecting the first solar panel when the power provided thereby is degraded below a selected value and thereby exposing said second solar panel to radiation of solar energy.

14. The method as recited in claim 13 wherein said first and second panels form a stack with said first panel on top so as to cover said second panel while being exposed to radiation of solar energy, whereby when said first panel is ejected it automatically exposes the second panel below it in the stack to radiation of solar energy.

* * * * *